Sept. 24, 1929.   N. R. HAAS   1,729,343
DYNAMO BRUSH
Filed Dec. 1, 1924
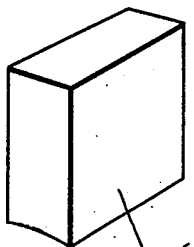
GRAPHITE
WATERGLASS
SINTERED RESINOUS MATERIAL.
Inventor
Nelson R. Haas
By Spencer, Sewall and Hardman
Attorney Patented Sept. 24, 1929

1,729,343

UNITED STATES PATENT OFFICE

NELSON ROBERT HAAS, OF DAYTON, OHIO, ASSIGNOR, BY MESNE ASSIGNMENTS, TO DELCO-REMY CORPORATION, OF DAYTON, OHIO, A CORPORATION OF DELAWARE

DYNAMO BRUSH

Application filed December 1, 1924. Serial No. 753,408.

This invention relates to brushes for dynamo electric machines and includes among its objects the provision of a brush having the required strength and hardness which will not unduly wear the commutator during the life of the brush and which will not deposit particles upon the commutator to any substantial extent.

Further objects and advantages of the present invention will be apparent from the following description of a preferred form thereof.

The brush is illustrated in the accompanying drawing.

The invention consists principally in combining with graphite a substance which will act as a binder and also as an abrasive. For this purpose what is known commercially as water glass has proved satisfactory as a binder and as an abrasive. Water glass is composed either of a silicate of sodium or potassium, or of a compound silicate of both sodium or potassium, such silicate being known to the trade as soluble.

Satisfactory results are obtained if the silicate is partly dehydrated so that the steam eliminated during the moulding process will not be excessive, but there should be sufficient water of crystallization to produce the necessary binding action.

The ingredients are mixed in the following proportions by weight:

{ 85% to 96% graphite { 15% to 4% soluble silicate

Artificial graphite mixed with partly dehydrated sodium silicate has been found satisfactory.

These ingredients are mixed in a dry state and a predetermined quantity is placed in a brush mould and is moulded under heat and pressure, the pressure being about 3000 lbs. per square inch and the heat being derived from steam pipes thermally connected with the die and carrying steam about 130 lbs. per square inch steam pressure, the temperature of steam being about 350° F.

The product is a dynamo brush comprising particles of graphite bound together with water glass. This product is entirely satisfactory for general purposes, but may be improved by further heat treatment in a nonoxidizing atmosphere. A quantity of brushes which have been made by the process just described are packed in carbonaceous material, such as bone-black, within a covered metal box, and subjected to a temperature of 1700° F.

A still further improved product may be obtained by adding a quantity of powdered resinous material, such as bakelite moulding powder, to the mixture of graphite and silicate. These ingredients are moulded under heat and pressure, as specified for moulding brushes of graphite and silicate alone and the moulded brushes are baked at about 1700° F. in a nonoxidizing atmosphere in order to coke or sinter the resinous material. Brushes made from a mixture of graphite, silicate and artificial resin by this process will be harder than brushes made by the same process from a mixture of graphite and silicate alone, but the former brush will be more distorted in the final process of sintering the resin content, than the latter brush in which no resin was present in the mixture used to form the brush. This distortion is believed to be due to the liberation of gases from the resinous material in coking.

Besides bakelite, "durite", a phenolic condensation compound of phenol and furfural may be used.

Satisfactory results have been obtained with varying proportions of graphite, bakelite and sodium silicate, for example,—

{ 86.7% graphite
{ 8.2% bakelite
{ 5.1% sodium silicate

{ 82 % graphite
{ 6 % bakelite
{ 12 % sodium silicate

{ 85 % graphite
{ 8 % bakelite
{ 7 % sodium silicate

{ 82 % graphite
{ 8 % bakelite
{ 10 % sodium silicate

While the form of embodiment of the present invention as herein disclosed, constitute preferred forms, it is to be understood that other forms might be adopted, all coming within the scope of the claims which follow.

What is claimed is as follows:

1. A dynamo brush including graphite, water glass and a non-abrasive moldable binder.

2. A dynamo brush comprising graphite, water glass and a sintered resinous material.

3. A dynamo brush comprising graphite, water glass and a sintered phenolic condensation product.

4. A dynamo brush comprising graphite, water glass and sintered bakelite.

5. A dynamo brush comprising graphite and a binder including sintered resinous material and water glass, the proportions by weight of graphite being above 80%.

6. A dynamo brush comprising graphite and a binder including sintered bakelite and water glass, the proportions by weight of sintered bakelite being from about 5% to 10% and the proportions by weight of graphite being above 80%.

7. The method of making a dynamo brush which consists in mixing graphite and a soluble silicate and moulding under heat and pressure.

8. The method of making a dynamo brush which comprises mixing graphite with a binding material including a partly dehydrated soluble silicate in a dry state, and moulding under pressure and heat at approximately 350° F. and treating in a nonoxidizing atmosphere at about 1700° F.

9. The method of making a dynamo brush which comprises mixing graphite, a partly dehydrated soluble silicate and an artificial resinous material in a dry state, and moulding under pressure and heat at approximately 350° F. and treating in a nonoxidizing atmosphere at about 1700° F.

In testimony whereof I hereto affix my signature.

NELSON ROBERT HAAS.